(12) United States Patent
Bilbeisi

(10) Patent No.: US 11,999,323 B2
(45) Date of Patent: Jun. 4, 2024

(54) GARAGE DOOR CLEANING CURTAIN

(71) Applicant: Ghassan Bilbeisi, Glendale, AZ (US)

(72) Inventor: Ghassan Bilbeisi, Glendale, AZ (US)

( * ) Notice: Subject to any disclaimer, the term of this patent is extended or adjusted under 35 U.S.C. 154(b) by 133 days.

(21) Appl. No.: 17/880,503

(22) Filed: Aug. 3, 2022

(65) Prior Publication Data

US 2024/0042970 A1 Feb. 8, 2024

(51) Int. Cl.
*B60S 3/04* (2006.01)
*B08B 1/14* (2024.01)
*B08B 1/20* (2024.01)
*B08B 13/00* (2006.01)

(52) U.S. Cl.
CPC ............... *B60S 3/04* (2013.01); *B08B 1/143* (2024.01); *B08B 1/20* (2024.01); *B08B 13/00* (2013.01)

(58) Field of Classification Search
CPC . B60S 3/04; B08B 13/00; B08B 1/143; B08B 1/20

USPC .......................................................... 15/97.3
See application file for complete search history.

(56) References Cited

U.S. PATENT DOCUMENTS

| | | | | |
|---|---|---|---|---|
| 3,331,425 A | * | 7/1967 | Stuart | E06B 3/80 160/237 |
| 4,232,725 A | * | 11/1980 | Gidge | E06B 3/80 160/332 |
| 2009/0205149 A1 | * | 8/2009 | Wentworth | B60S 3/04 15/97.3 |
| 2014/0345814 A1 | * | 11/2014 | Bar-lev | A47H 15/02 160/333 |
| 2019/0241159 A1 | * | 8/2019 | Schuster | B60S 3/04 |
| 2020/0198593 A1 | * | 6/2020 | Schmalzel, Jr. | B60S 3/06 |

* cited by examiner

*Primary Examiner* — Katina N. Henson
(74) *Attorney, Agent, or Firm* — Bruce A. Lev

(57) ABSTRACT

A car cleaning curtain for attaching to and hanging from a garage door including a curtain rod and flexible panel adapted to hang down from a garage door when the garage door is in an open position and adapted to attract and retain dust and dirt from surfaces of a vehicle when the vehicle is in contact with and is moving with respect to the car cleaning curtain.

15 Claims, 7 Drawing Sheets

GARAGE DOOR CLEANING CURTAIN

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. 37 CFR 1.71(d).

BACKGROUND OF THE INVENTION

1. Field of the Invention

This invention relates generally to garage door curtains, and more specifically to a garage door curtain that is adapted to clean a vehicle when entering and exiting a garage.

2. Description of the Related Art

Prior art garage curtains are primarily plastic sheets that are attached to a frame of a garage and hang over an opening. Their primary use is to prevent air, dust, and dirt from entering a particular space. There are no known apparatuses that are designed to be attached to and hang from a garage door to wipe and clean a vehicle when entering and exiting a garage.

BRIEF SUMMARY OF THE INVENTION

The present invention sets forth a car cleaning curtain. As such, the general purpose of the present invention, which will be described subsequently in greater detail, is to provide a car cleaning curtain for attaching to and hanging from a garage door including a curtain rod and flexible panel adapted to hang down from a garage door when the garage door is in an open position and adapted to attract and retain dust and dirt from surfaces of a vehicle when the vehicle is in contact with and is moving with respect to the car cleaning curtain.

There has thus been outlined, rather broadly, the more important features of the invention in order that the detailed description thereof that follows may be better understood and in order that the present contribution to the art may be better appreciated.

Numerous objects, features and advantages of the present invention will be readily apparent to those of ordinary skill in the art upon a reading of the following detailed description of presently preferred, but nonetheless illustrative, embodiments of the present invention when taken in conjunction with the accompanying drawings. The invention is capable of other embodiments and of being practiced and carried out in various ways. Also, it is to be understood that the phraseology and terminology employed herein are for the purpose of descriptions and should not be regarded as limiting.

BRIEF DESCRIPTION OF THE DRAWINGS

The figures which accompany the written portion of this specification illustrate embodiments according to the teachings of the present invention.

The various embodiments of the present invention will hereinafter be described in conjunction with the appended drawings.

DETAILED DESCRIPTION

The embodiments of the present disclosure described below are not intended to be exhaustive or to limit the disclosure to the precise forms disclosed in the following detailed description. Rather, the embodiments are chosen and described so that others skilled in the art may appreciate and understand the principles and practices of the present disclosure.

The following embodiments and the accompanying drawings, which are incorporated into and form part of this disclosure, illustrate embodiments of the invention and together with the description, serve to explain the principles of the invention. To the accomplishment of the foregoing and related ends, certain illustrative aspects of the invention are described herein in connection with the following description and the annexed drawings. These aspects are indicative, however, of but a few of the various ways in which the principles of the invention can be employed and the subject invention is intended to include all such aspects and their equivalents. Other advantages and novel features of the invention will become apparent from the following detailed description of the invention when considered in conjunction with the drawings.

Figure 2:
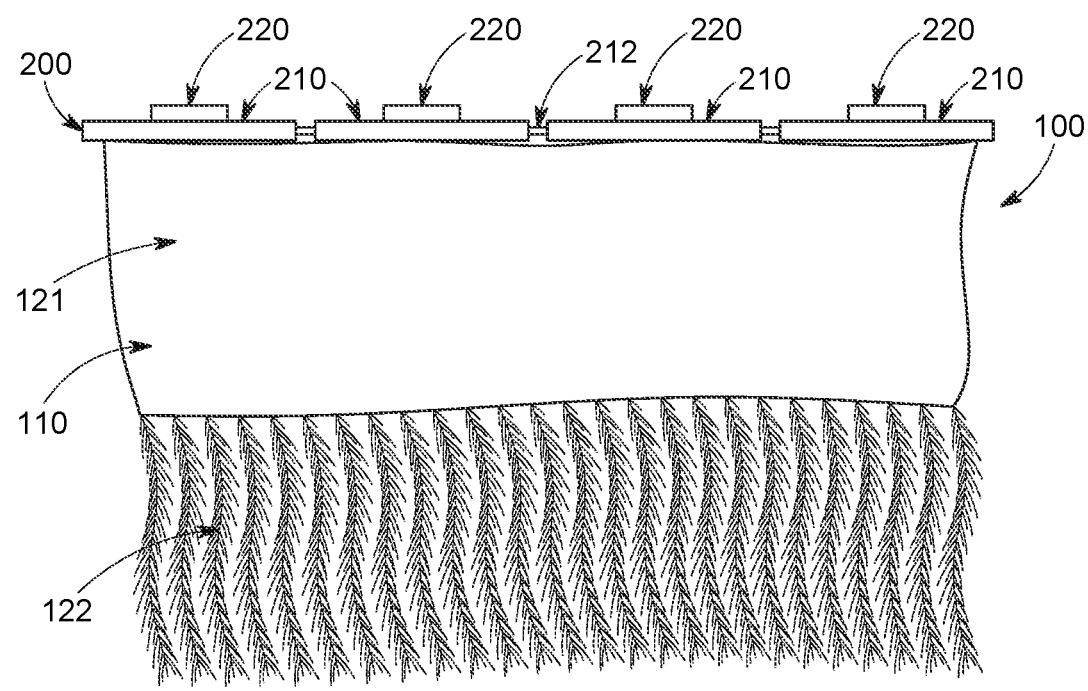
FIG. 2 shows a front view of the car cleaning curtain according to a second embodiment of the present invention.
Figure 3:
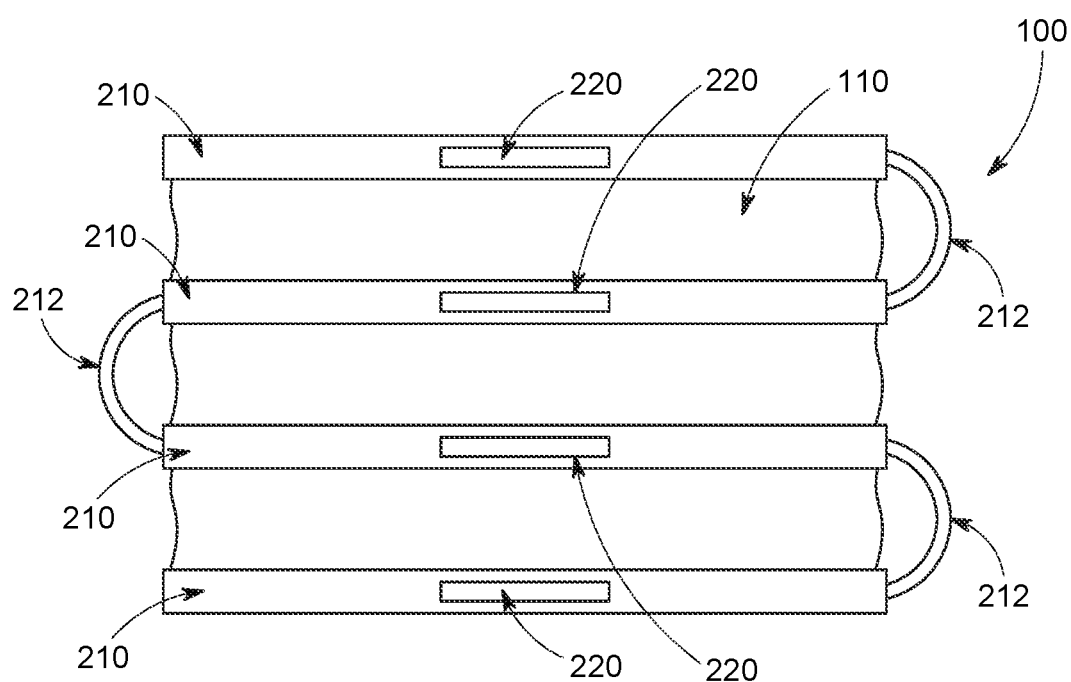
FIG. 3 shows a top view of the car cleaning curtain in a folded configuration according to the preferred embodiment of the present invention of FIG. 1.
Figure 4:
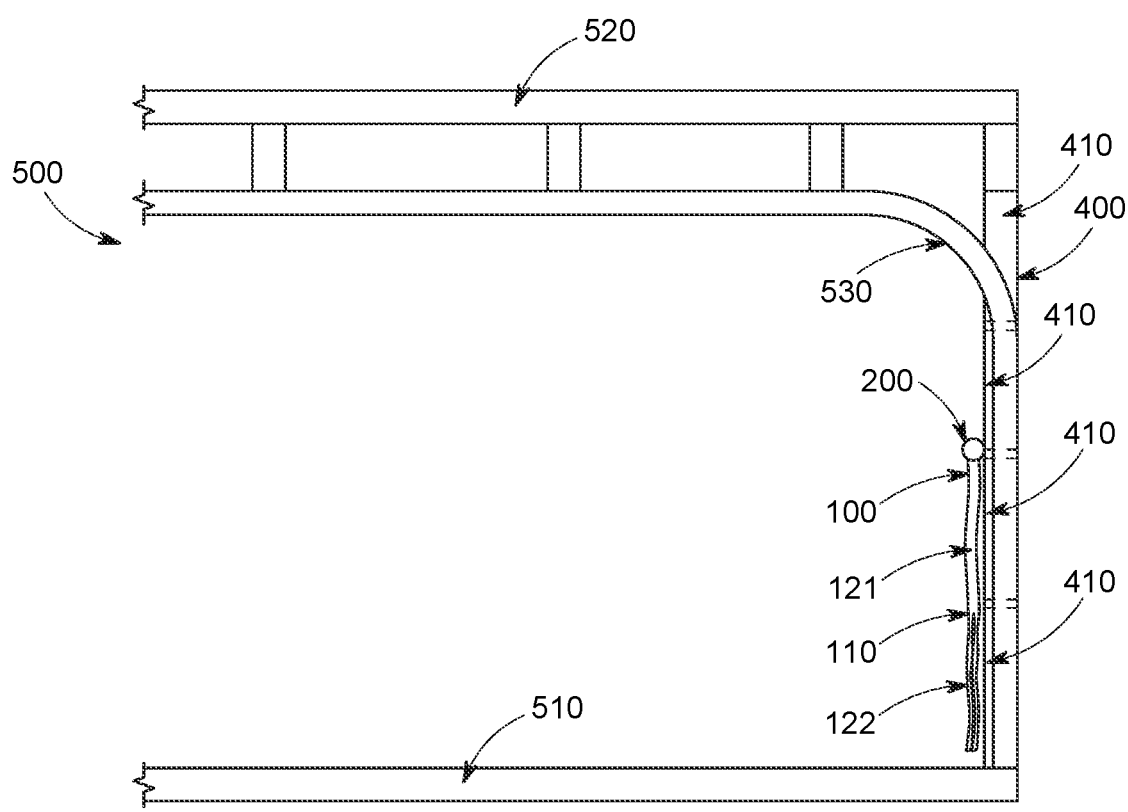
FIG. 4 shows a side view of the car cleaning curtain attached to a garage door in the closed configuration according to the preferred embodiment of the present invention of FIG. 1.
Figure 5:
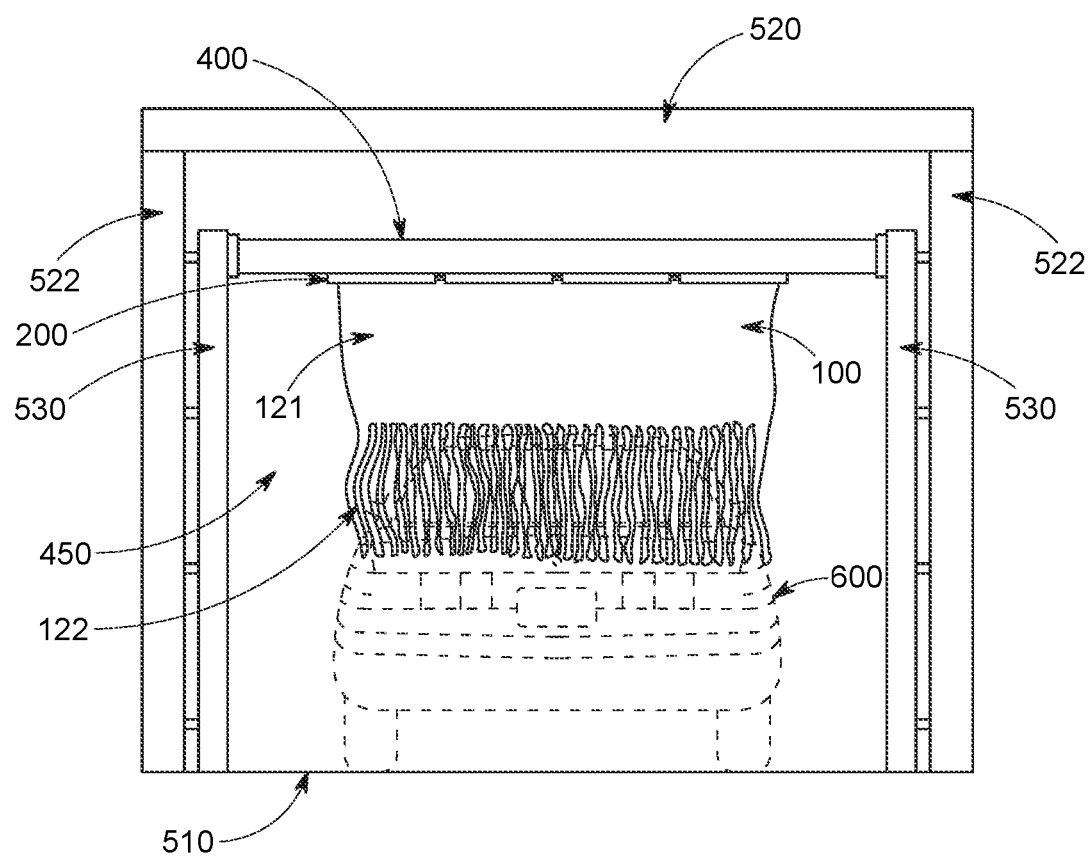
FIG. 5 shows a front view of the car cleaning curtain attached to a garage door in the open and in-use configuration according to the preferred embodiment of the present invention of FIG. 1.
Figure 6:
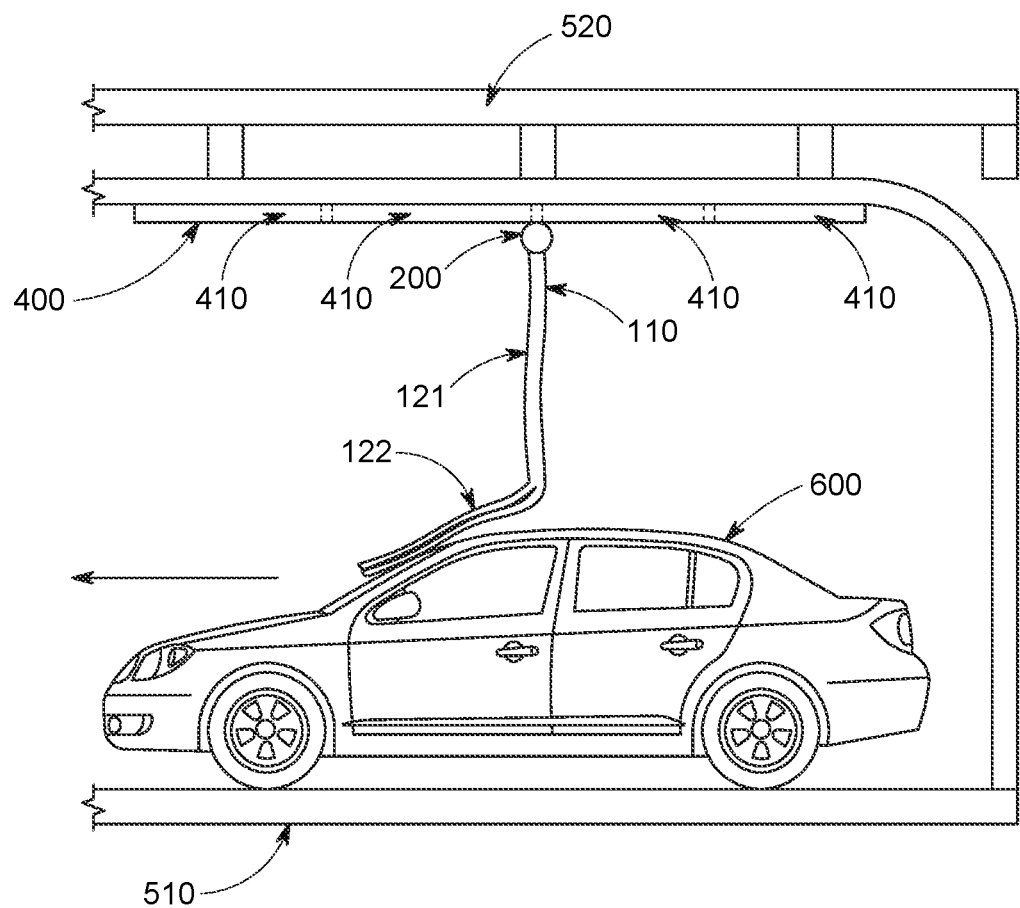
FIG. 6 shows a side view of the car cleaning curtain attached to a garage door in the open and in-use configuration according to the preferred embodiment of the present invention of FIG. 1.
Figure 7:
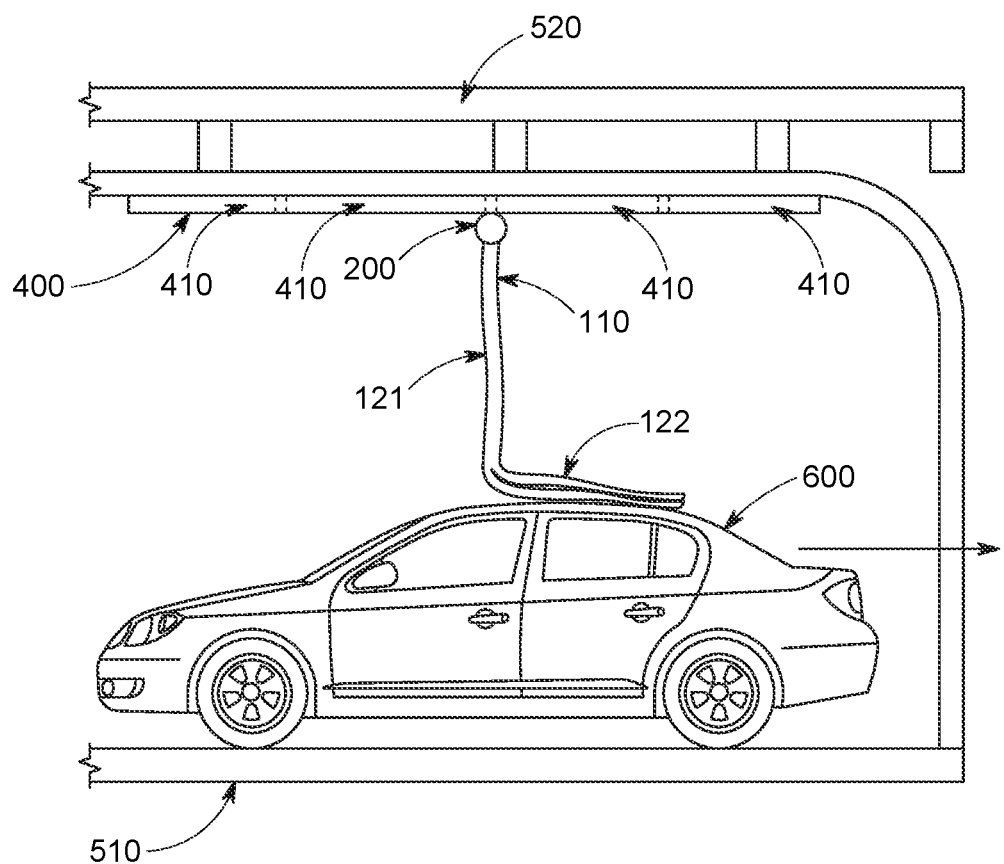
FIG. 7 shows a side view of the car cleaning curtain attached to a garage door in the open and in-use configuration according to the preferred embodiment of the present invention of FIG. 1.

Turning now descriptively to drawing, referring to FIGS. 1-7, the present invention discloses a car cleaning curtain 100 for attaching to and hanging from a garage door 400 including at least one panel 410 having an outside surface and an inside surface, wherein the garage door 400 is adapted to be moved from a closed position, as shown in FIG. 4, covering a garage opening 450 and an open position, as shown in FIGS. 5-7, wherein the garage door is lifted upwardly to a substantially horizontal position exposing the garage opening 450. The car cleaning curtain 100 comprises a flexible panel 110 having a height h, a width w, a top edge 112; a bottom edge 114; a first side edge 116; and a second side edge 118, and wherein the flexible panel is formed from a material that is adapted to attract and retain dust and dirt from surfaces of a vehicle 600 when the vehicle is in contact with and is moving with respect to the flexible panel 110; and a curtain rod 200 including an elongated body having a length at least equal to said width of the flexible panel 110, and at least one connector member 220 connected to the elongated body and is adapted to releasably attach to the inside surface of the at least one panel 410 of the garage door 400 at a height thereof equal to the height of the flexible panel 110, wherein a substantial portion of the top edge 112 of the flexible panel is connected to the curtain rod 200. The flexible panel 110 is adapted to hang down from the garage door 400 when the garage door is in an open position and is adapted to attract and retain dust and dirt from surfaces of a vehicle when the vehicle is in contact with and is moving with respect to the car cleaning curtain.

Figure 1:
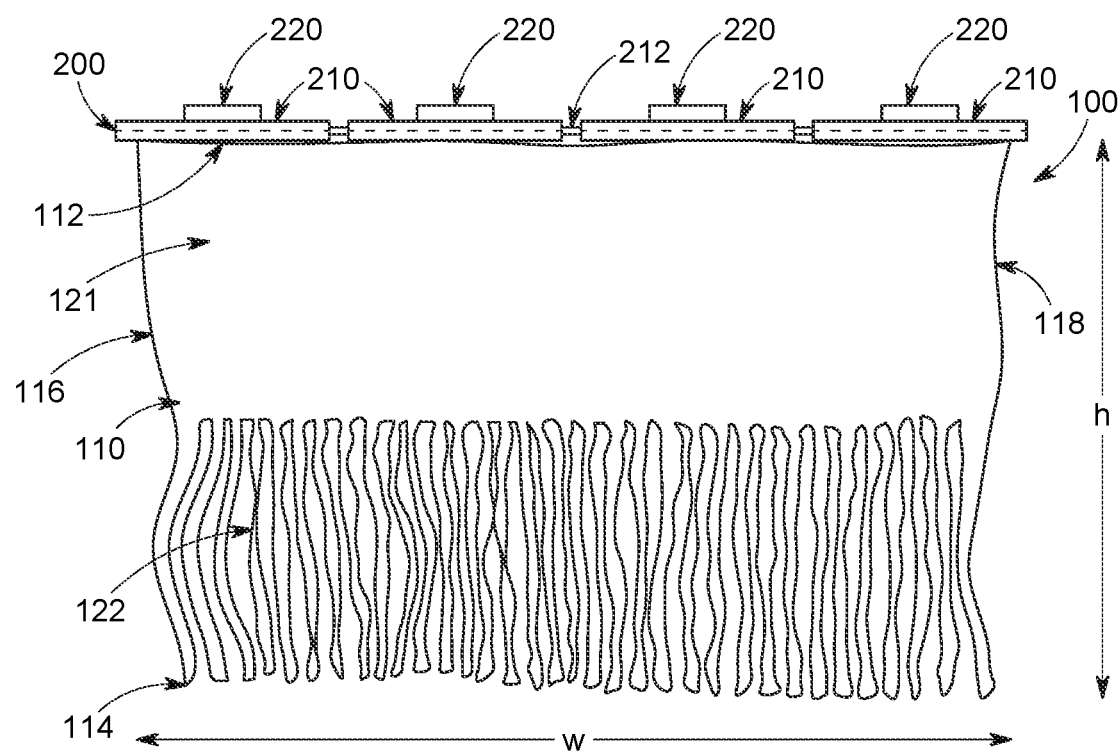
FIG. 1 shows a front view of the car cleaning curtain according to the preferred embodiment of the present invention.

In the preferred embodiment, the flexible panel 110 includes a first material 121 connected at a top edge thereof to the curtain rod and extends therefrom and may be formed from materials including chamois, cotton, burlap, nylon, or the like. The second material 122 may be formed from a either a chamois cloth, as shown in FIG. 1, or a feather duster material, as shown in FIG. 2, or the like, wherein the second material is connected to a bottom edge of the first material and extends therefrom. The first material 121 may be divided along a portion of its height into a plurality of elongated strips, and the second material 122 may be divided into a plurality of elongated strips each respectively connected to a bottom edge of the first panel and/or the bottom edge of respective elongated strips of the first material and extending therefrom.

In the preferred embodiment, the elongated body of the curtain rod 200 is formed having a cylindrical shape and be divided into a plurality of curtain rod sections 210 that are interconnected at respective adjacent edges thereof by either respective flexible connectors therebetween or by an elongated flexible connector member 212 running through the hollow plurality of curtain rod sections 210 and attached at respective distal ends of the curtain rod 200, such that the car cleaning curtain 100 can be folded and placed into a stored configuration, as shown in FIG. 3. The body of the curtain rod 200 may be hollow, and the flexible connector member 212 formed as an elongated resilient cord extending through each of the plurality of curtain rod sections and is attached to opposite distal ends of the curtain rod. Each of the plurality of curtain rod sections 210 may include at least one connector member 220 adapted to releasably attach to the garage door 400.

In the preferred embodiment, the car cleaning curtain 100 is formed having four curtain rod sections 210, each having a length of two feet, thereby forming a curtain width w of eight feet. The preferred curtain height h is four feet. The car cleaning curtain 100 is best attached to the inside surface of a garage door 400 at a height of four feet from its bottom edge. As such, when the garage door is full opened, as shown in FIGS. 5-7, the car cleaning curtain 100 may extend downwardly toward the garage floor 510 at a height such that when a vehicle is moving with respect to the car cleaning curtain 100 and contacts the curtain it attracts and retains dust and dirt from surfaces of the vehicle 600 and thereby cleans the vehicle.

The curtain rod connector members 220 may be formed as spring clips, or screws, or nuts and bolts, or the like depending on the type of garage door it is being attached to.

Most garages 500 are built upon a garage floor 510 and formed including a ceiling 520 and side walls 522. Furthermore, most garage door mechanisms include garage door tracks 530 to guide the garage door 400 and associated panels 410 in open and closed configurations.

Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the present invention.

Although the invention has been explained in relation to its preferred embodiment, it is to be understood that many other possible modifications and variations can be made without departing from the spirit and scope of the invention.

What is claimed is:

1. A car cleaning curtain for garage doors, comprising:
   a flexible panel;
      wherein said flexible panel has a height and a width;
      wherein said flexible panel has a top edge; a bottom edge; a first side edge; and a second side edge; and
      wherein said flexible panel is formed from a material that is adapted to attract and retain dust and dirt from surfaces of a vehicle to clean said vehicle when said vehicle is in contact with and is moving with respect to said flexible panel; and
   a curtain rod including:
      an elongated body;
         wherein said elongated body has a length at least equal to said width of said flexible panel; and
      at least one connector member;
         wherein said at least one connector member is connected to said elongated body and is adapted to releasably attach to a garage door at a height thereof equal to said height of said flexible panel;
      wherein said elongated body of said curtain rod is divided into a plurality of curtain rod sections that are interconnected at respective adjacent edges thereof by a flexible connector member, such that said car cleaning curtain can be folded and placed into a stored configuration;
      wherein said elongated body of said curtain rod is hollow; and
      wherein said flexible connector member is formed as an elongated resilient cord extending through each of said plurality of curtain rod sections and is attached to opposite distal ends of said curtain rod;
   wherein a substantial portion of said top edge of said flexible panel is connected to said curtain rod; and
   wherein said flexible panel is adapted to hang down from said garage door when said garage door is in an open position and is adapted to attract and retain dust and dirt from surfaces of a vehicle when said vehicle is in contact with and is moving with respect to said car cleaning curtain.

2. The car cleaning curtain of claim 1, wherein said flexible panel includes:
   a first material;
      wherein said first material is connected at a top edge thereof to said curtain rod and extends therefrom: and
   a second material formed from a chamois cloth;
      wherein said second material is connected to a bottom edge of said first material and extends therefrom.

3. The car cleaning curtain of claim 2, wherein said first material is divided along a portion of its height into a first plurality of elongated strips; and wherein said second material is divided into a second plurality of elongated strips each respectively connected to a bottom edge of an elongated strip of said first material and extending therefrom.

4. The car cleaning curtain of claim 1, wherein said flexible panel includes:
   a first material;

wherein said first material is connected at a top edge thereof to said curtain rod and extends therefrom: and a second material formed from a feather duster material; wherein said second material is connected to a bottom edge of said first material and extends therefrom.

5. The car cleaning curtain of claim 4, wherein said first material is divided along a portion of its height into a first plurality of elongated strips; and wherein said second material is divided into a second plurality of elongated strips each respectively connected to a bottom edge of an elongated strip of said first material and extending therefrom.

6. The car cleaning curtain of claim 1, wherein said elongated body of said curtain rod is formed having a cylindrical shape.

7. The car cleaning curtain of claim 1, wherein each of said plurality of curtain rod sections includes at least one said connector member adapted to releasably attach to said garage door.

8. A combination of a garage door and a car cleaning curtain, said combination comprising:
a garage door including:
at least one panel;
wherein each of said at least one panel includes:
an outside surface; and
an inside surface;
wherein said garage door is adapted to be moved from a closed position covering a garage opening, and an open position wherein said garage door is lifted upwardly to a substantially horizontal position exposing said garage opening; and
a car cleaning curtain comprising:
a flexible panel;
wherein said flexible panel has a height and a width;
wherein said flexible panel has a top edge; a bottom edge; a first side edge; and a second side edge; and
wherein said flexible panel is formed from a material that is adapted to attract and retain dust and dirt from surfaces of a vehicle to clean said vehicle when said vehicle is in contact with and is moving with respect to said flexible panel; and
a curtain rod including:
an elongated body;
wherein said elongated body has a length at least equal to said width of said flexible panel; and
at least one connector member;
wherein said at least one connector member is connected to said elongated body and is adapted to releasably attach to said inside surface of said at least one panel of said garage door at a height thereof equal to said height of said flexible panel;
wherein said elongated body of said curtain rod is divided into a plurality of curtain rod sections that are interconnected at respective adjacent edges thereof by a flexible connector member, such that said car cleaning curtain can be folded and placed into a stored configuration;
wherein said elongated body of said curtain rod is hollow; and wherein said flexible connector member is formed as an elongated resilient cord extending through each of said plurality of curtain rod sections and is attached to opposite distal ends of said curtain rod;
wherein a substantial portion of said top edge of said flexible panel is connected to said curtain rod;
wherein said flexible panel is adapted to hang down from said garage door when said garage door is in an open position and is adapted to attract and retain dust and dirt from surfaces of a vehicle when said vehicle is in contact with and is moving with respect to said car cleaning curtain.

9. The combination of claim 8, wherein said flexible panel includes:
a first material;
wherein said first material is connected at a top edge thereof to said curtain rod and extends therefrom: and a second material formed from a chamois cloth; wherein said second material is connected to a bottom edge of said first material and extends therefrom.

10. The combination of claim 9, wherein said first material is divided along a portion of its height into a first plurality of elongated strips; and wherein said second material is divided into a second plurality of elongated strips each respectively connected to a bottom edge of an elongated strip of said first material and extending therefrom.

11. The combination of claim 8, wherein said flexible panel includes:
a first material;
wherein said first material is connected at a top edge thereof to said curtain rod and extends therefrom: and a second material formed from a feather duster material; wherein said second material is connected to a bottom edge of said first material and extends therefrom.

12. The combination of claim 11, wherein said first material is divided along a portion of its height into a first plurality of elongated strips; and wherein said second material is divided into a second plurality of elongated strips each respectively connected to a bottom edge of an elongated strip of said first material and extending therefrom.

13. The combination of claim 8, wherein said elongated body of said curtain rod is formed having a cylindrical shape.

14. The combination of claim 8, wherein each of said plurality of curtain rod sections includes at least one said connector member adapted to releasably attach to said garage door.

15. The combination of claim 8, wherein said flexible panel of said car cleaning curtain has a height of four feet; and said garage door includes a plurality of panels pivotally connected to one another along adjacent edges thereof; and wherein said curtain rod is connected to one edge of one of said plurality of panels via said at least one connector member at approximately four feet from a bottom edge of said garage door.

* * * * *